C. McNEIL.
CUTTING MECHANISM.
APPLICATION FILED NOV. 15, 1907.

1,143,421.

Patented June 15, 1915.
5 SHEETS—SHEET 4.

Witnesses
C. W. Walker.
Grace P. Brereton.

Inventor
Chester McNeil
By Sturtevant & Mason
Attorneys

THE NORRIS PETERS CO., PHOTO-LITHO., WASHINGTON, D. C.

C. McNEIL.
CUTTING MECHANISM.
APPLICATION FILED NOV. 15, 1907.

1,143,421.

Patented June 15, 1915.
5 SHEETS—SHEET 5.

Witnesses
C. H. Walker
Grace P. Brereton

Inventor
Chester McNeil
By
Sturtevant & Mason
Attorneys

THE NORRIS PETERS CO., PHOTO-LITHO., WASHINGTON, D. C.

UNITED STATES PATENT OFFICE.

CHESTER McNEIL, OF CHICAGO, ILLINOIS, ASSIGNOR TO UNION SPECIAL MACHINE COMPANY, OF CHICAGO, ILLINOIS, A CORPORATION OF ILLINOIS.

CUTTING MECHANISM.

1,143,421.  Specification of Letters Patent.  Patented June 15, 1915.

Application filed November 15, 1907. Serial No. 402,292.

*To all whom it may concern:*

Be it known that I, CHESTER MCNEIL, a citizen of the United States, residing at Chicago, in the county of Cook, State of Illinois, have invented certain new and useful Improvements in Cutting Mechanisms, of which the following is a description, reference being had to the accompanying drawing and to the letters and figures of reference marked thereon.

My invention relates to cutting mechanisms and more especially to cutting mechanisms adapted to be used in connection with sewing machines, although it is obvious from certain aspects of the invention, that the cutting mechanism may be used by itself where it is desired to cut one or more of a plurality of superimposed layers of fabric and to automatically control the position of the cutter, so that one or more of the layers may be cut, or varying thicknesses of the fabric may be cut.

The object of my invention is to provide a device in connection with a cutting mechanism which shall automatically position the cutting mechanism so that various thicknesses of fabric may be cut.

A further object of my invention is to provide a sewing machine with a cutting mechanism which shall cut one or more layers, or a plurality of superimposed layers of material prior to the stitching operation, and to automatically control the position of the cutting mechanism, so that a predetermined number of layers may be cut, regardless of the thickness of the material forming the layers.

Further objects of my invention will in part be obvious and will in part be more fully hereinafter described.

Figure 1:
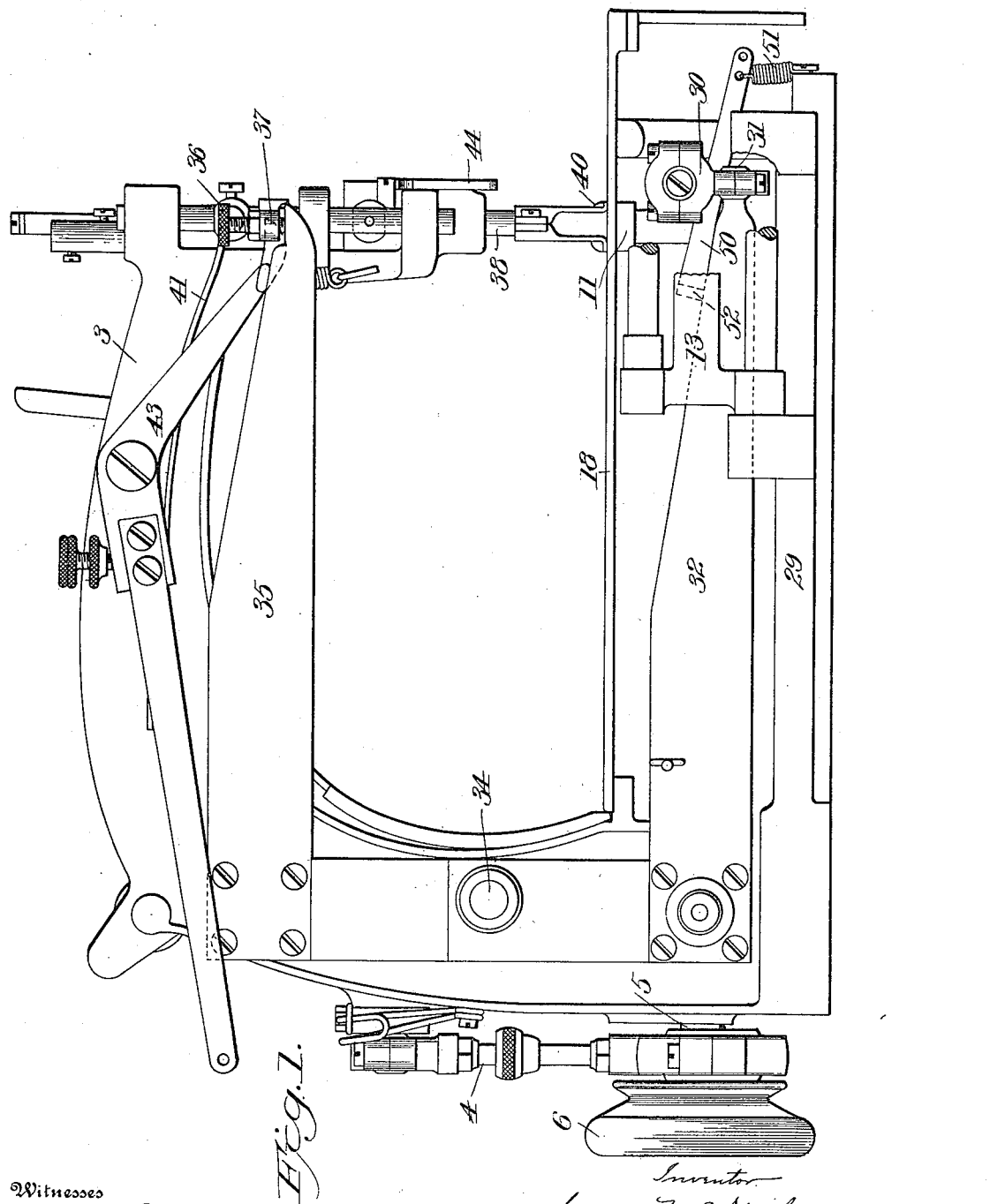
Figure 2:
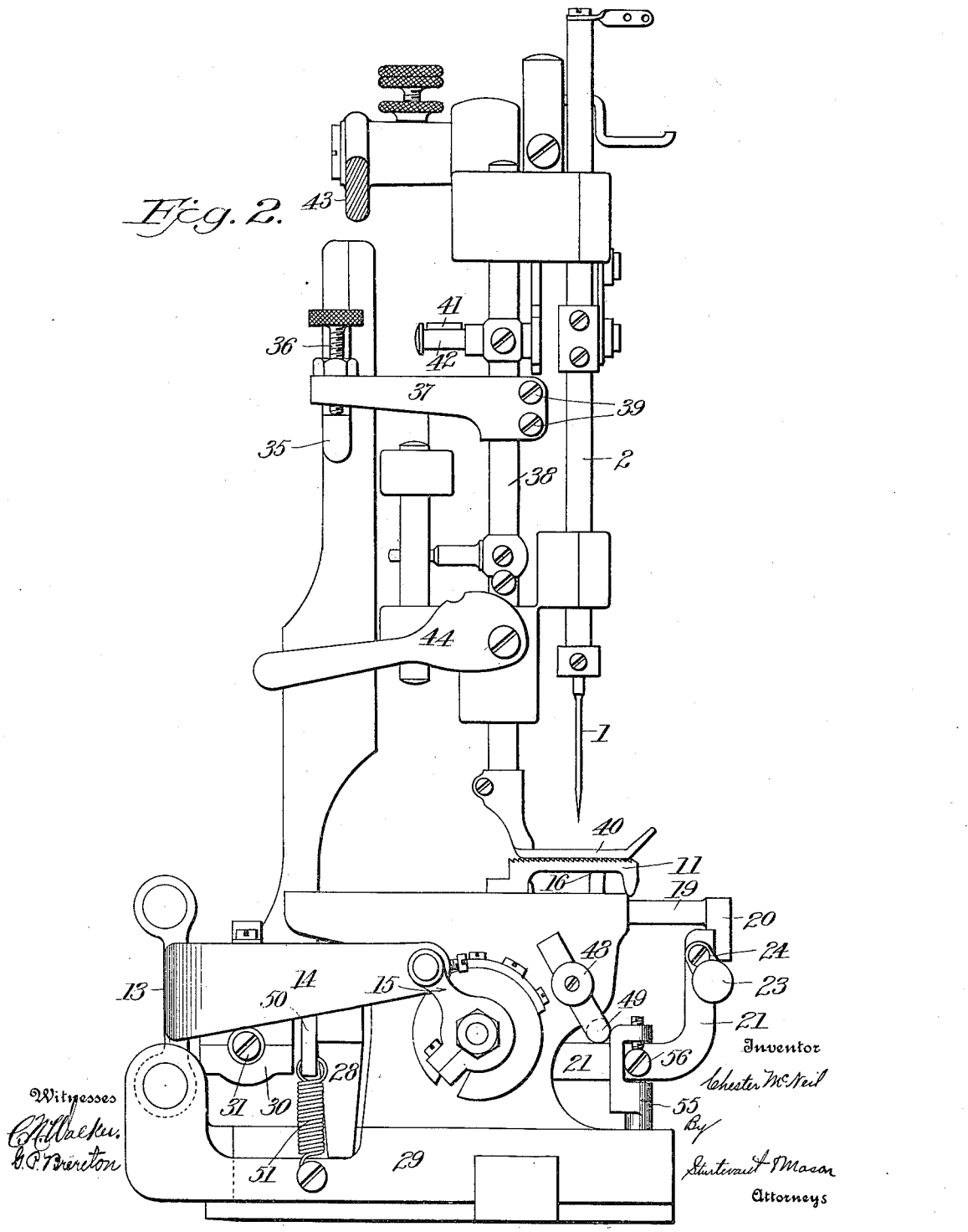
Figure 3:
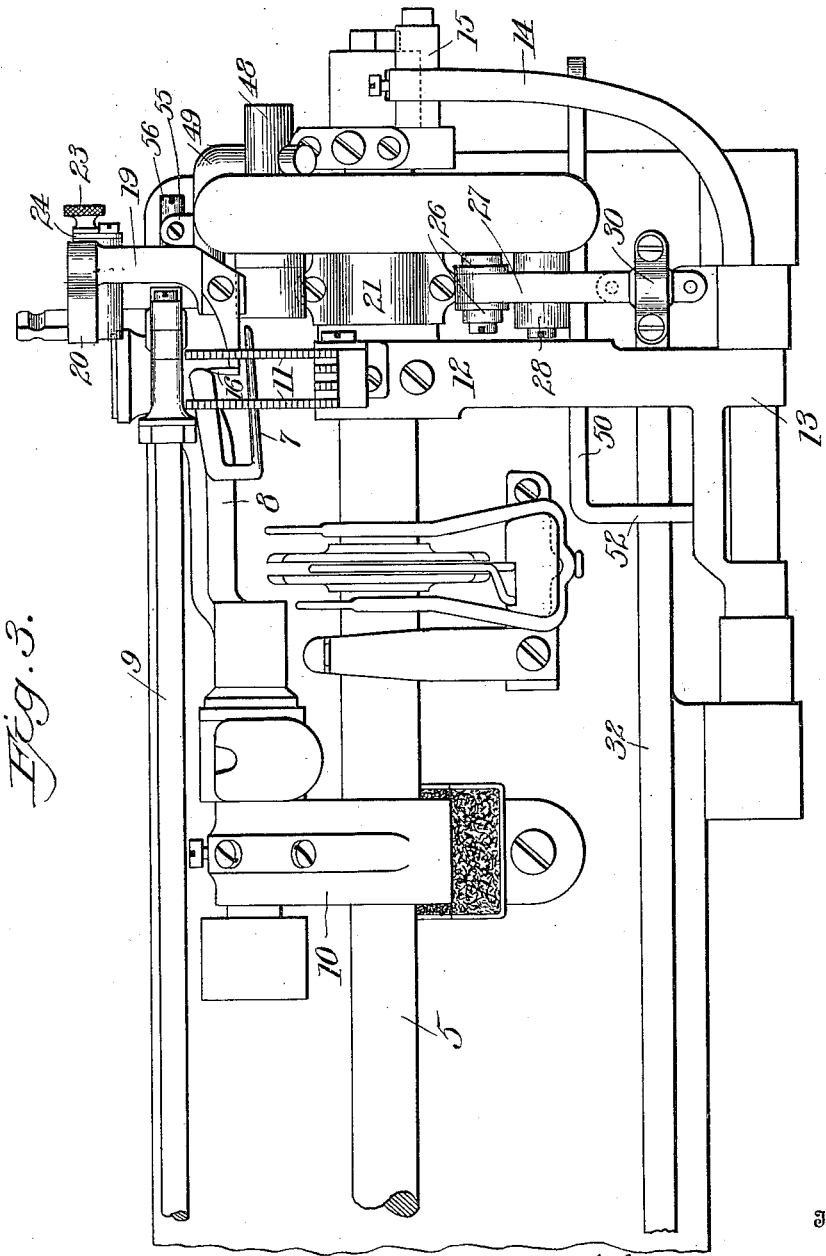
Figure 4:
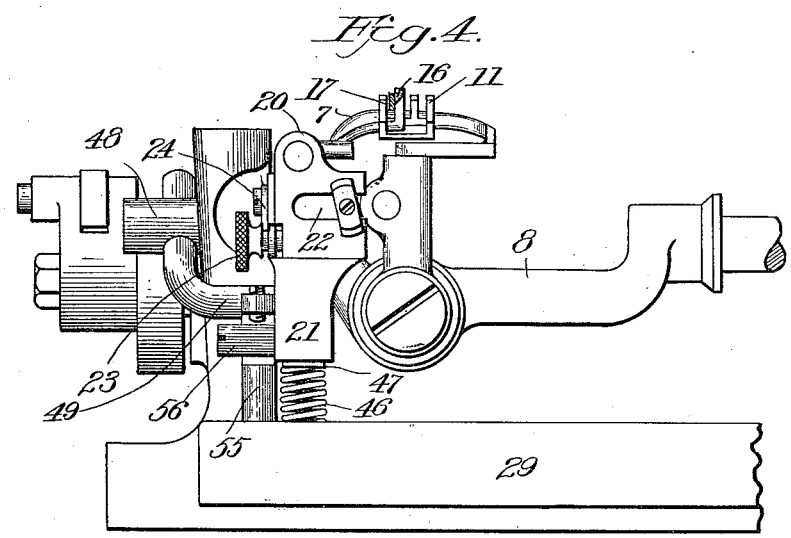
Figure 5:
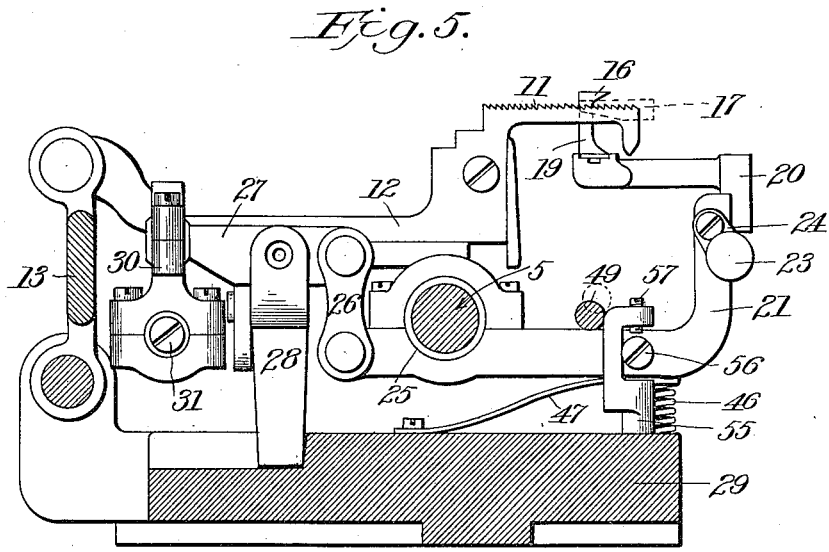
Figure 6:
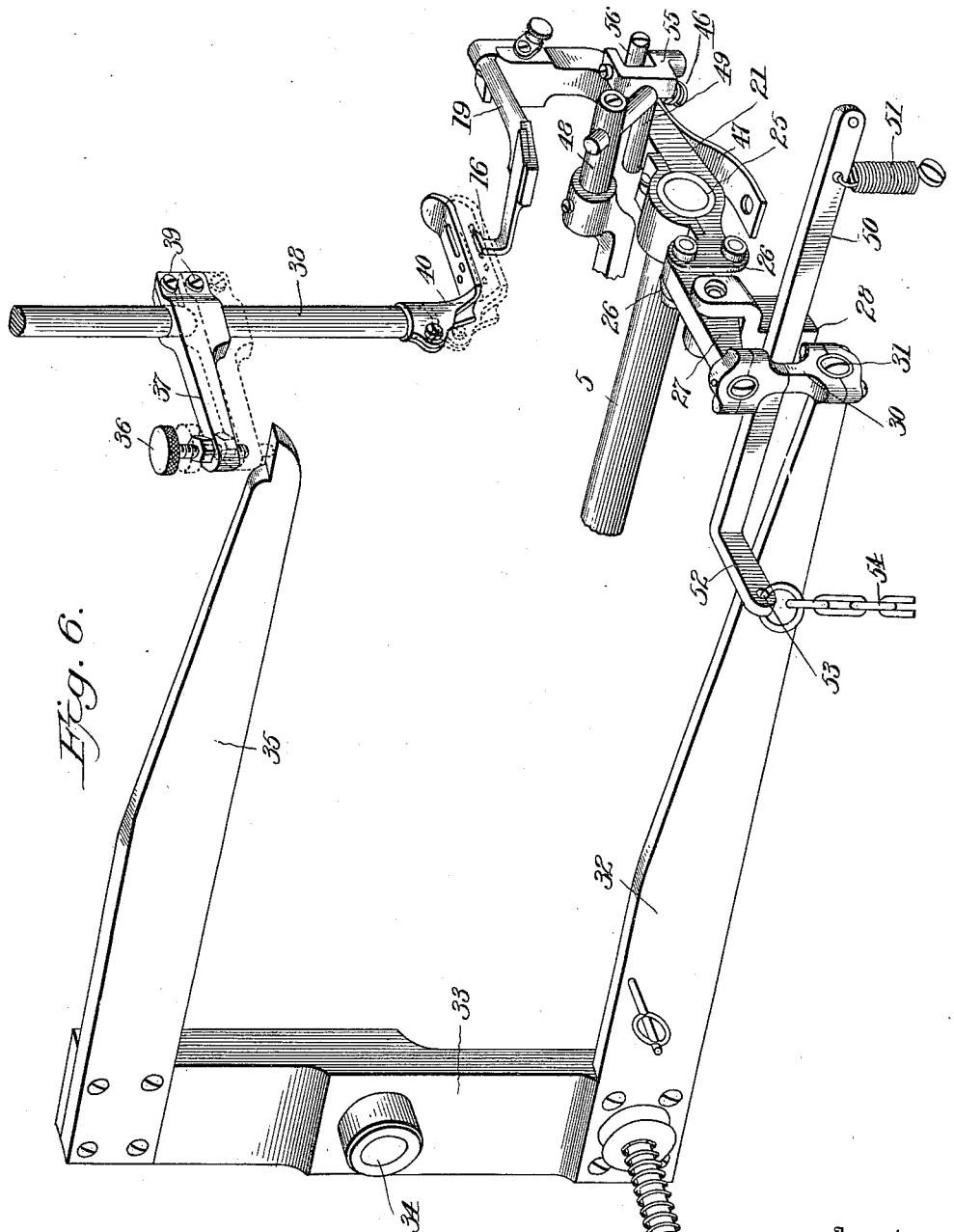

In the drawings which show by way of illustration one embodiment of my invention: Figure 1 is a rear side elevation of a sewing machine embodying my invention, certain parts being broken away for the sake of clearness. Fig. 2 is an end view of the same, with the work support removed. Fig. 3 is a top plan view of the parts underneath the work support at the forward end of the machine. Fig. 4 is a detail view showing a portion of the trimming mechanism, looper operating mechanism and feeding mechanism. Fig. 5 is a detail view partly in section showing the trimming mechanism and a portion of the controlling means therefor. Fig. 6 is a detail perspective, showing a portion of the trimming mechanism and the controlling means therefor, the presser foot being shown as raised and in dotted lines as lowered.

I have shown my invention for controlling the cutting mechanism as applied to a sewing machine. Said sewing machine is of the usual character and forms no part of the present invention.

In a general way it may be stated that the sewing machine includes a plurality of needles 1, carried by a needle bar 2, which is reciprocated in the forward end of the overhanging arm 3 by the usual needle lever which in turn is vibrated by a link 4, connected to an eccentric on the main shaft 5, which is rotated by the usual belt wheel 6. The looper 7 which coöperates with the needles is pivoted to a looper support 8, and is oscillated by means of a link 9, which is connected to the needle lever in the usual way. The looper support is vibrated so as to give the looper its needle avoiding movements by means of a yoke 10, which is rigidly secured to the looper support and engages an eccentric carried by the main shaft 5. The feed dog 11 is also of the usual construction, and is mounted on the forward end of a feed bar 12, which is pivoted to a rocking frame 13 which receives its vibrations through an arm 14 pivoted at its forward end to a link 15, carried by a crank disk on the forward end of the main shaft 5.

In the present illustrated embodiment of my invention, the movable cutter 16 is of the type which extends up through the work support and has a forwardly extending penetrating point with a cutting edge formed on the under side of the forwardly extending portion. Said movable cutting member 16 coöperates with a stationary cutter 17, mounted in the work support 18, with its upper cutting edge substantially flush with the upper surface of the work support. The movable cutting member 16 is carried by a cutter supporting arm 19 which is rigidly supported by a bracket 20. Said bracket 20 is adjustably supported on the outer end of the cutter supporting and operating bar 21. I have shown in the present embodiment of my invention, a thumb screw carried by the supporting bar which extends through a slot 22 in the bracket.

An adjusting screw 23 extends through a threaded opening in the bracket 20 and a fork lug 24 secured to the cutter supporting bar engages a groove in said adjusting screw and prevents longitudinal movement of the screw relative to the cutter supporting bar.

When it is desired to adjust the movable cutter relative to its supporting bar, and the stationary cutter, the thumb screw is loosened and the adjusting screw turned until the movable cutter is properly positioned after which the thumb screw is tightened and the parts thereby firmly locked in place.

The cutter supporting bar 21 is fulcrumed on a concentric hub 25, which encircles the main shaft 5. At its rear end, the cutter supporting bar is pivoted to a pair of links 26, which in turn are pivoted to one end of a lever 27 which is fulcrumed on a standard 28 rigidly secured to the bed plate 29 in any suitable way.

The lever 27 at its outer end is connected by means of a ball stud to a link 30 which link is pivoted at its other end to a ball stud 31 carried by the yoke controlling lever 32. The yoke controlling lever 32, is pivoted at 34 to the standard of the machine, and carries an upper arm 35 which is substantially parallel with the arm pivoted to the link 30. The upper arm 35, extends to the forward end of the machine and rests underneath an adjusting screw 36 carried by an arm 37 secured to the presser bar 38, by clamping screws 39.

The presser bar 38 is of the usual construction and carries a presser foot 40 at its lower end. Said presser bar is held depressed by means of a spring 41 which is secured to the overhanging arm 3 of the machine at one end and rests at its forward end on a lug 42 formed on a collar secured to the presser bar. The presser bar may be lifted by means of a lever 43, which is connected to a suitable foot treadle or the presser bar may be lifted by a hand lever 44 pivoted to the forward end of the machine and engaging a lug 45 carried by the presser bar.

A coil spring 46, see Figs. 4 and 5, is placed underneath the cutter supporting bar 21, and normally holds said cutter supporting bar with its forward end raised and the cutter 16 elevated above the work support. I have also shown a leaf spring 47 secured to the bed plate 29 and engaging the cutter supporting bar 21, which serves the same purpose. It will be obvious that either one of these springs may be omitted if desired.

As a means for operating the movable cutter 16, I have provided the looper support 8, with a forwardly extended portion 48, which of course, is vibrated with the looper support as the looper is given its lateral movements.

Extending through the portion 48 of the looper support, is a bent arm 49, see Figs. 3 and 6. Said bent arm extends downwardly and thence across the cutter supporting bar 21. It will be obvious that as the looper support is oscillated, the arm 49 will be swung into contact with the looper supporting bar 21, and said bar depressed against the action of the springs 46 and 47.

When the looper support is oscillated in the opposite direction, the arm 49 will be swung away from the cutter supporting bar and the springs 46 and 47 will raise the forward end of the cutter supporting bar 21, elevating the cutter.

It will be noted that if the controlling yoke 32 be swung downward, the link 30 will operate to lower the rear end of the lever 27, which in turn will raise the forward end of said lever and through the links 26, swing the cutter supporting bar about the hub 25, on the main shaft 5, and thus lower the forward end of the cutter bar, and consequently lower the position of the cutter relative to the work support.

It will be apparent that if sufficient movement is given to the yoke 32, the cutter may be lowered entirely beneath the work support and rendered ineffective. As a means for lowering the yoke 32, I have provided the L-shaped lever 50 which is pivoted to the standard 28. One end of said lever 50 is connected to the work support by means of a coil spring 51 and the other end of said lever which is bent laterally as at 52, extends over the controlling yoke 32 and is provided in its outer end with an eye 53, which may be connected to a foot treadle or a knee lever by a chain or other suitable connection 54.

The spring 51 normally holds the L-shaped lever 50 with its bent end together with the weight of the treadle raised from contact with the controlling lever 32, and therefore, the weight of the treadle will not in any way, interfere with the operation of the controlling lever. When however, it is desired to render the cutter ineffective, the treadle is lowered or shifted and through the flexible connection, the lever 50 is brought into contact with the controlling yoke 32, which is lowered and as above noted, the cutter is withdrawn below the work support.

As a means for limiting the movement of the cutter, I have provided a stop 55 which is yoke shaped and between the members of the yoke, is a projecting pin 56, carried by the cutter supporting bar 21. When the pin 56 is brought into contact with the lower member of the yoke on the stop 55, further movement of the cutter downward is prevented.

The spring for controlling the presser bar is considerably stronger than the spring for raising the cutter supporting bar. As a consequence, when the presser bar is lowered, the yoke 32 will be carried down with the presser bar until the presser foot contacts with the material being stitched, or the work support. When however, the presser bar is raised for the insertion of the material, the adjustable contact screw 36 is raised from contact with the controlling yoke 32 and the springs 46 and 47 will therefore immediately lift the forward end of the cutter supporting bar, turning the lever 27 and lifting the yoke 32 therewith. As a means for limiting the upward movement of the cutter when the presser foot is lifted from contact with the controlling yoke, I have provided the upper member of the yoke on the stop 55, with an adjustable stop screw 57.

It will be noted of course, that when the presser foot is raised for the insertion of the work, the needles should be in their extreme upper position and the looper at this time is in such a position that the arm 49 is raised to its extreme upper position and is out of contact with the cutter operating bar 21. The throw of the operating arm 49 must necessarily be sufficient so as to be brought out of contact with the cutter operating bar 21, otherwise, the extreme upper position of the cutter operating bar and of the cutter relative to the work support could not be varied.

It will be apparent from the above description that the extreme upper position of the movable cutter is determined by the position of the presser bar which in turn is controlled by the presser foot bearing upon the material and therefore, the position of the cutter relative to the work support and in the material, is controlled by the thickness of the material. At the same time, the controlling mechanism is so constructed that the cutter may at any time be lowered beneath the work support, and rendered ineffective. The controlling mechanism is also so constructed that the presser foot may be raised at any time, the usual distance for the insertion of the material without in any way disarranging the members of the cutting mechanism.

The operation of my device will be apparent from the above description.

When the needles are at the upper end of their stroke, the looper is at the forward end of its stroke and is moved laterally for the needle avoiding movement. As the looper moves laterally, the looper support is oscillated, the operating arm 49 is brought into contact with the cutter supporting bar 21, and the cutter is moved downward and thus given its cutting stroke. As soon as the looper swings back to its normal position for entrance to the needle loops, the operating arm 49 is moved out of contact with the cutter supporting bar 21, and the springs 46 and 47 lift the forward end of the cutter supporting bar 21, raising the cutter above the work support. When the arm 49 lowers the forward end of the cutter supporting bar, said bar swings about the hub 25, thus raising the rear end of the bar, swinging the lever 27, and lowering the controlling yoke 32. When the arm 49 is however, moved from contact with the cutter supporting bar 21, the springs will raise the forward end of the cutter bar, lowering the rear end thereof, swinging the lever 27 and raising the controlling yoke, until the forward end of the arm 35 of said yoke contacts with the adjusting screw 36. Further upward movement of the cutter will be prevented by reason of the fact that the spring holding the presser bar down upon the material is of greater tension than the spring lifting the cutter supporting bar. It will be obvious therefore, that if the thickness of material passing beneath the work support should increase, the presser bar will be lifted as it passes up on to the increased thickness of material, and consequently, the springs underneath the forward end of the cutter supporting bar, will raise the cutter a little higher and until the controlling yoke 32 contacts with the adjusting screw 36. On the other hand, if the increased thickness of the material decreases, the presser foot will be slightly lowered and the adjusting screw thereby lowered so that the springs 46 and 47 cannot raise the cutter quite so far, for the controlling yoke 32 will be brought into engagement with the adjustable screw 36 at an earlier period.

Having thus particularly described my invention, what I claim as new and desire to secure by Letters Patent is:—

1. The combination of a work support, a presser foot, a feeding mechanism and a cutting mechanism, said cutting mechanism including a cutter having a penetrating point and a cutting edge, said penetrating point entering between the layers to be cut, and means independent of the cutter for automatically positioning said penetrating point relative to the work support for varying thicknesses of material.

2. The combination of a work support, a presser foot, a feeding mechanism and a cutting mechanism, said cutting mechanism including a cutter having a penetrating point and a cutting edge, said penetrating point entering between the layers to be cut, and means independent of the cutter contacting with the upper surface of the material for automatically shifting the position of said penetrating point relative to the work support for varying thicknesses of material.

3. The combination with a work support, a presser foot and feeding mechanism, of a cutter having a penetrating point adapted to enter between the layers of fabric to be cut, means for actuating the cutter, and means controlled by the presser foot for shifting the position of the cutter relative to the work support for positioning the penetrating point relative to the work support for varying thicknesses of fabric.

4. The combination of a work support, and a feeding mechanism, of cutting mechanism located beneath the work support and including a cutter extending above the work support, and means for automatically positioning said cutter relative to the work support for varying thicknesses of material.

5. The combination with a work support and a feeding mechanism, of cutting mechanism located beneath the work support and including a cutter extending above the work support, and means contacting with the upper surface of the material for automatically shifting the position of said cutter.

6. The combination with a work support, a presser foot and a feeding mechanism, of a cutting mechanism located beneath the work support and including a cutter extending above the work support and means controlled by said presser foot for shifting the position of the cutter relative to the work support.

7. The combination with a work support, a feeding mechanism, of a cutting mechanism including a cutter having a penetrating point entering between the layers of fabric to be cut, means for rendering said cutter ineffective, and means for automatically varying the position of the cutter, relative to the work support for varying thicknesses of material.

8. The combination with a work support and a feeding mechanism, of a cutting mechanism including a cutter having a penetrating point entering between the layers of fabric to be cut, means for rendering said cutter ineffective, and means for automatically varying the position of the cutter for varying thicknesses of material.

9. The combination with a work support, a feeding mechanism, and a presser foot, of a cutting mechanism, located beneath the work support, and including a cutter extending above the work support, means for rendering said cutter ineffective and means controlled by the presser foot, for automatically shifting the position of the cutting mechanism, for varying thicknesses of fabric.

10. The combination with a work support and a feeding mechanism adapted to feed a plurality of superposed layers of material, of a cutting device including a cutter having a separating point adapted to separate and cut one or more of said superposed layers and means independent of the cutter for automatically shifting the position of said separating point ot the cutter, relative to said work support, upon varying thicknesses of material being presented to the cutter.

11. The combination of a work support, an overhanging arm, a presser bar mounted in said overhanging arm, a presser foot carried thereby and a feeding mechanism, of a cutting mechanism located beneath the work support and including a stationary cutter carried by said work support, a movable cutter projecting above and overhanging said work support, means for reciprocating said movable cutter, and means for automatically shifting the position of said overhanging cutter relative to the work support, for varying thicknesses of material.

12. The combination with a work support, an overhanging arm, a presser bar mounted in said overhanging arm, a presser foot carried thereby and a feeding mechanism, of a cutting mechanism located beneath the work support and including a stationary cutter carried by said work support, a movable cutter projecting above and overhanging said work support, and means controlled by said presser foot for automatically shifting the position of said overhanging cutter, relative to said work support for varying thicknesses of material.

13. The combination with a work support, an overhanging arm, a presser bar mounted in said overhanging arm, a presser foot carried thereby and a cutting mechanism located beneath the work support and including a stationary cutter carried by said work support, a movable cutter projecting above and overhanging said work support, means for reciprocating said movable cutter, means for rendering said overhanging cutter ineffective and means for automatically shifting the position of said overhanging cutter relative to the work support for varying thicknesses of material.

14. The combination with a work support, a presser foot and a feeding mechanism, of a cutting mechanism, including a cutter, means for supporting the cutter independently of the presser foot, and means controlled by said presser foot for varying the position of the cutter relative to the work support, said controlling means being so constructed that said presser foot may be raised from the work support for the insertion of the material.

15. The combination with a work support, a standard, an overhanging arm, a presser foot supported by said overhanging arm, a cutting mechanism located beneath said work support and including a cutter extending above and overhanging said work support, and means for automatically shifting the position of said cutter, relative to the work support, including an arm substantially parallel with the overhanging arm and controlled by said presser foot.

16. The combination with a work support, a standard, an overhanging arm, a presser foot supported by said overhanging arm, a cutting mechanism located beneath said work support and including a cutter extending above and overhanging said work support, and means for automatically shifting the position of said cutter relative to the work support, including a yoke pivoted to said standard and having one of its arms substantially parallel with the overhanging arm, and its other arm extending beneath the work support, and connected to said mechanism.

17. The combination with a work support, a presser foot, a cutting mechanism comprising a cutter overhanging the work support, means for supporting the cutter independently of the presser foot, means for positively lowering the cutter to sever the material, means for raising said cutter and automatic means for varying the extreme upper position of said cutter according to the thickness of the fabric being severed.

18. The combination with a work support, a presser foot, a feeding mechanism and a cutting mechanism, including a cutter overhanging the work support, means for supporting the cutter independently of the work support, means for positively lowering said cutter to sever the fabric, a spring for raising said cutter and automatic means controlled by the presser foot for determining the extreme upper position of said cutter.

19. The combination with a work support, a presser foot, a feeding mechanism and a cutting mechanism including a cutter overhanging the work support, means for positively lowering said cutter to sever the fabric, a spring for raising said cutter, automatic means controlled by the presser foot for determining the extreme upper position of said cutter, and means for limiting the upward movement of the cutter, when the presser foot is lifted from the material.

20. The combination with a work support, a feeding mechanism, a looper mechanism, a cutting mechanism, comprising a cutter overhanging the work support, means operated from said looper mechanism for lowering the cutter to sever the material, and means for raising said cutter.

21. The combination of a work support, a feeding mechanism, a looper mechanism, a cutting mechanism comprising a cutter overhanging the work support, means operated from said looper mechanism for lowering the cutter to sever the material, means for raising said cutter, and automatic means for controlling the extreme upper position of said cutter according to the thickness of the material being cut.

22. The combination with a work support, a feeding mechanism, a looper mechanism, a cutting mechanism comprising a cutter overhanging the work support, means operated from said looper mechanism, for lowering the cutter to sever the material, means for raising said cutter, and means for rendering said cutter ineffective.

23. The combination of a work support, a presser foot, a cutting mechanism, including a cutter, means for operating said cutter, means for controlling the position of said cutter relative to the work support, including a yoke connected to said presser foot and means for engaging said yoke, and depressing the same, whereby the said cutter is rendered ineffective.

24. The combination of a work support, a cutting mechanism including a cutter, means for operating said cutter, means for controlling the position of said cutter relative to the work support, including a yoke and means for engaging said yoke, a lever normally held disengaged from said yoke, and means for moving said lever into contact with said yoke, and depressing the same, for rendering the cutter ineffective.

25. The combination of a work support, a presser foot, a cutting mechanism including a cutter, means for operating said cutter, means for controlling the position of said cutter relative to the work support, including a yoke connected to said presser foot and means for engaging said yoke and depressing the same whereby said cutter is rendered ineffective, and a stop for limiting the extreme downward movement of said cutter.

26. The combination of a work support, a main shaft, a cutter supporting bar pivoted on said main shaft, and means operated from said main shaft for swinging said cutter bar about said main shaft as a fulcrum to sever the material.

27. The combination of a work support, a main shaft, a cutter supporting bar pivoted on said main shaft, means operated from said main shaft for swinging said cutter about said main shaft to sever the material, and means for automatically shifting the position of said cutter, relative to the work support, for varying thicknesses of material.

28. The combination of a work support, a main shaft, a cutter supporting bar, pivoted on said main shaft, means operated from said main shaft for swinging said cutter bar about said main shaft to sever the material, means for automatically shifting the position of said cutter relative to the work support for varying thicknesses of material, and means for rendering said cutter ineffective.

29. The combination with a work support, a main shaft, a cutter supporting bar pivoted upon said main shaft to swing thereon as a fulcrum, a cutter carried by the forward end of said bar, means connected to the rear end of said bar for varying the position of the cutter relative to the work support, and means operated from said main shaft for swinging said cutter bar about said main shaft to sever the material.

30. The combination with a work support, a main shaft, a cutter supporting bar pivoted upon said main shaft, a cutter carried by the forward end of said bar, means connected to the rear end of said bar for varying the position of the cutter relative to the work support, means for engaging said cutter supporting bar for positively lowering the cutter to sever the material, and a spring for raising said cutter supporting bar.

31. The combination with a work support, a main shaft, a looper mechanism including a looper support, a cutting mechanism comprising a cutter supporting bar pivoted to swing about the main shaft, means connected to said looper support for swinging said cutter supporting bar, and automatic means for varying the position of said cutter relative to the work support for varying thicknesses of fabric.

32. The combination with a work support, a looper mechanism including a looper support, a main shaft, a cutting mechanism comprising a cutter supporting bar, an arm carried by said looper support and extending over the cutter supporting bar, whereby as said looper is vibrated, the cutter supporting bar is oscillated, means for raising said cutter bar and automatic means for determining the extreme upper position of the cutter relative to the work support.

33. The combination with a work support, a main shaft, a cutting mechanism located beneath the work support, and including a cutter supporting bar mounted on a hub carried by the main shaft, a cutter carried by said cutter supporting bar, means for swinging said cutter supporting bar about said shaft as a fulcrum to cause the cutter to sever the fabric and means for swinging said cutter supporting bar about said shaft to render the cutter ineffective.

34. The combination with a work support, a main shaft, a cutting mechanism located beneath the work support and including a cutter supporting bar mounted on a hub carried by the main shaft, a cutter carried by said cutter supporting bar, means for swinging said cutter supporting bar about said shaft to cause the cutter to sever the fabric, means for swinging said cutter supporting bar about said shaft to render the cutter ineffective, and automatic means for controlling the position of the cutter relative to the work support for varying thicknesses of fabric.

35. The combination of a work support, a presser foot, a presser bar carrying said presser foot, a cutting mechanism located beneath the work support and including a cutter overhanging the work support and a cutter supporting bar pivoted to swing about the main shaft a looper mechanism, an arm carried by said looper mechanism for swinging said cutter supporting bar to sever the fabric, a yoke connected to said cutter mechanism and operated by said cutter bar for controlling the position of the cutter relative to the work support for varying thicknesses of fabric, and means for rendering said cutter ineffective.

36. The combination with a work support and feeding mechanism, of a cutting mechanism including a cutter having a penetrating point entering between the layers of fabric to be cut and means coacting with the upper surface of the material for shifting the position of the penetrating point of the cutter relative to the work support for varying thicknesses of fabric.

37. The combination with a work support, of a presser foot, and means to raise it from the work support, a feeding mechanism, a cutter, means for operating said cutter, and means controlled by said presser foot for shifting the position of the cutter relative to the work support.

38. The combination with a work support, of a presser foot and feeding mechanism, of a cutter, means for operating said cutter and means controlled by said presser foot for shifting the position of said cutter relative to the work support, said means including devices whereby the cutter is given a differential movement to that of the presser foot.

39. The combination of a work supporting member and a cutting mechanism including a cutting device mounted beneath the work support and projecting above and overhanging said work support, a presser foot adapted to engage the material in advance of the cutting device, connections between the cutting device and the presser foot whereby the position of the cutting device relative to the work support may be adjusted upon the shifting of the position of the presser foot relative to the work support.

40. In a cutting mechanism, a cutting device, a presser foot arranged to move vertically, means for supporting said cutting device independently of said presser foot and connections between the presser foot and the cutting device whereby when one is moved the other is simultaneously actuated.

41. The combination of a work supporting member and a cutting mechanism including a cutting device mounted beneath the work support and projecting above and overhanging said work support, a presser foot adapted to engage the material in advance of the cutting device, connections between the cutting device and the presser foot whereby the position of the cutting device relative to the work support may be adjusted upon the shifting of the position of the presser foot relative to the work support, said cutting device having a piercing point adapted to penetrate a fabric.

42. The combination with a work support and a feeding mechanism, of a cutting mechanism including a fixed and a movable blade, means for operating said movable blade, and means for automatically positioning said movable blade relative to said fixed blade and the work support for varying thicknesses of fabric.

43. The combination of a work-supporting member and a feed mechanism, of a cutting mechanism including a cutting blade having a penetrating point adapted to engage the fabric between the work support and a member contacting with the upper face thereof, means for vertically adjusting the penetrating point of the cutting mechanism and said work-supporting member relatively, said means including a connection with the member contacting with the upper face of the fabric.

In testimony whereof I affix my signature, in presence of two witnesses.

CHESTER McNEIL.

Witnesses:
 WARD E. WRIGHT,
 GEO. F. DANFORTH.

Copies of this patent may be obtained for five cents each, by addressing the "Commissioner of Patents, Washington, D. C."